Figure 1:
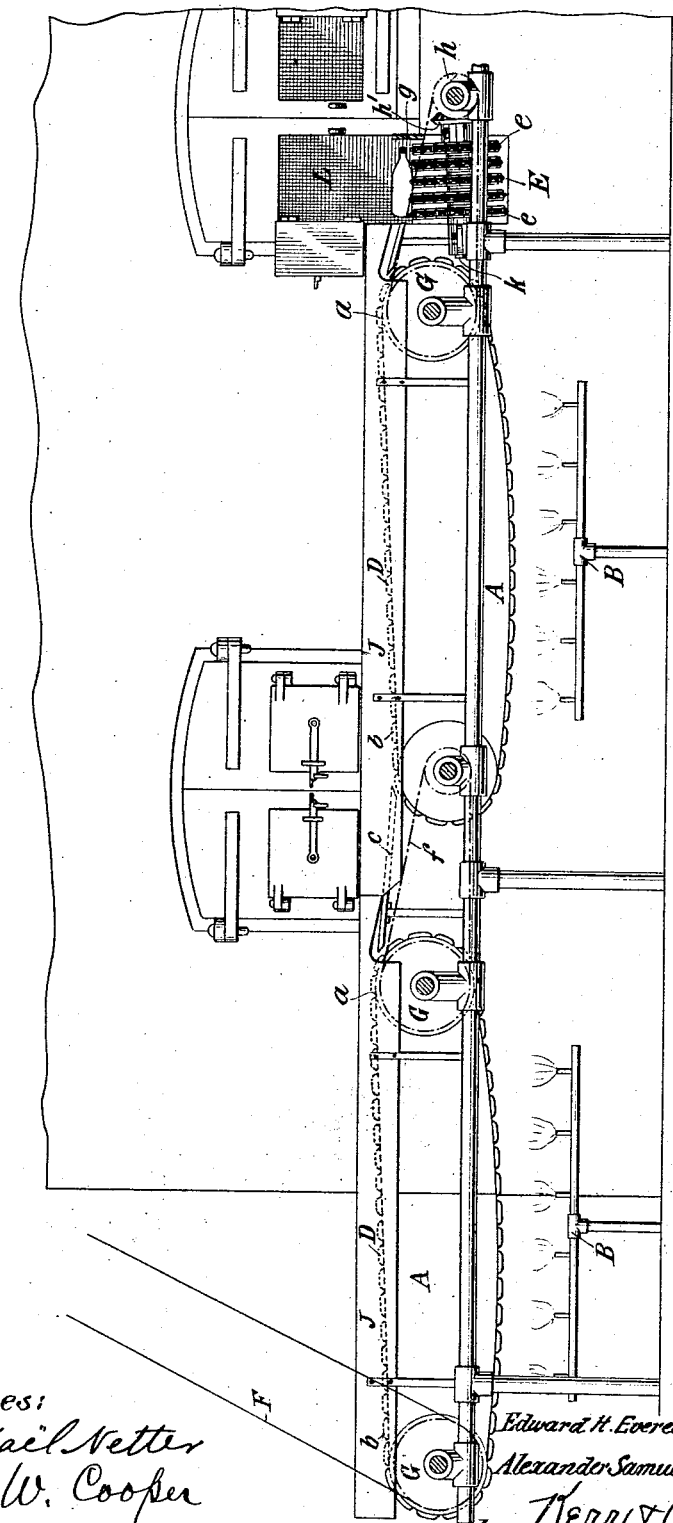

(No Model.) 3 Sheets—Sheet 2.

E. H. EVERETT & A. SAMUELSON.
CONVEYER FOR ARTICLES OF GLASS.

No. 570,626. Patented Nov. 3, 1896.

Witnesses:
Raphaël Netter
Drury W. Cooper

Edward H. Everett and
Alexander Samuelson
Inventors
by Kerr & Curtis Att'ys.

(No Model.) 3 Sheets—Sheet 3.

E. H. EVERETT & A. SAMUELSON.
CONVEYER FOR ARTICLES OF GLASS.

No. 570,626. Patented Nov. 3, 1896.

Witnesses:
Raphaël Netter
Drury W. Cooper

Edward H. Everett and
Alexander Samuelson, Inventors
by Kerr & Curtis, Attorneys.

UNITED STATES PATENT OFFICE.

EDWARD H. EVERETT AND ALEXANDER SAMUELSON, OF NEWARK, OHIO.

CONVEYER FOR ARTICLES OF GLASS.

SPECIFICATION forming part of Letters Patent No. 570,626, dated November 3, 1896.

Application filed January 4, 1896. Serial No. 574,341. (No model.)

*To all whom it may concern:*

Be it known that we, EDWARD H. EVERETT and ALEXANDER SAMUELSON, of the city of Newark, county of Licking, and State of Ohio, have invented a new and useful Apparatus for Conveying Articles of Glassware from the Molding-Press or Blower's Bench into the Annealing-Ovens or Leers, of which the following is a full, clear, and exact description, reference being had to the drawings accompanying and forming a part of the same.

Prior to the invention subject of our present application it was customary in the manufacture of articles of glassware to employ a number of boys, known in shop-parlance as "carrying-in" boys, whose duties were to receive the articles as soon as blown or molded and while still hot and carry them with short forks or similar carrying-tools to the leers or annealing-ovens, into which they deposited them. In the case of many articles, such as bottles, an attendant at the leer with a suitable tool piled up in layers the articles as fast as they were deposited in the leer by the carrying-in boys, and this operation is known as "stacking up." This procedure, the only one practiced in glass manufacture prior to our improvements, is one of the greatest drawbacks to the economical production of glassware. A large number of boys or men is necessary, and as they are required to do their work with the greatest despatch crowding at the leers is unavoidable and accidents are of frequent occurrence.

The general object of our invention is to obviate the difficulties encountered in this operation and to provide a mechanical device for transferring the glass articles from the molding-table or blower's bench into the leers without injury to the articles and in such manner that they may be stacked up by the attendant with rapidity and ease. In carrying out this object we have devised an apparatus comprising a conveyer arranged to travel from one or more molders' tables or blowers' benches to points in front of the doors of one or more annealing-ovens or leers, but on a different level from that of said doors, and upon which the glass articles, such as bottles, may be placed while still hot by the molders or blowers and transported to the leers. With such conveyer are employed lateral conveyers extending obliquely from the main conveyer into the leers and adapted to turn the course of the articles from the main conveyer and deliver said articles into the leers in position from which they may be readily taken and stacked up by the attendant at the leer.

Our present invention resides in an apparatus of the kind described when constructed and arranged for operation in the manner stated, and it further involves certain special improvements in the same, which will be more particularly hereinafter described, and pointed out in the subjoined claims.

Figure 2:
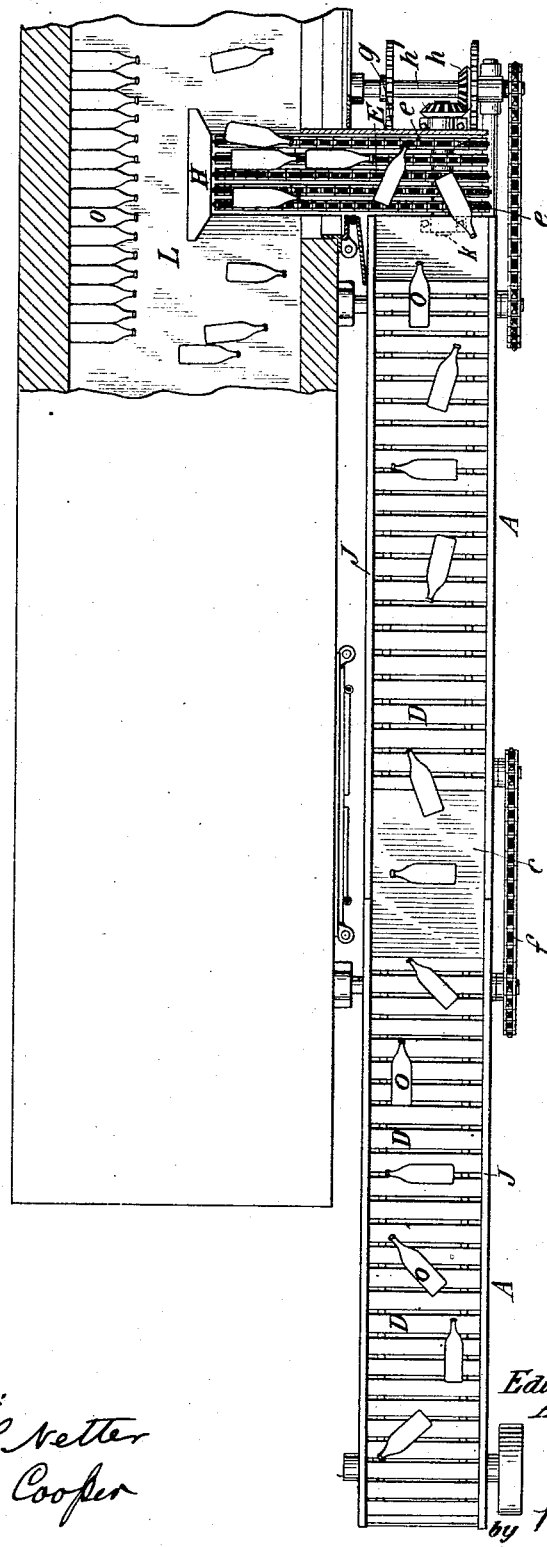
Figure 3:
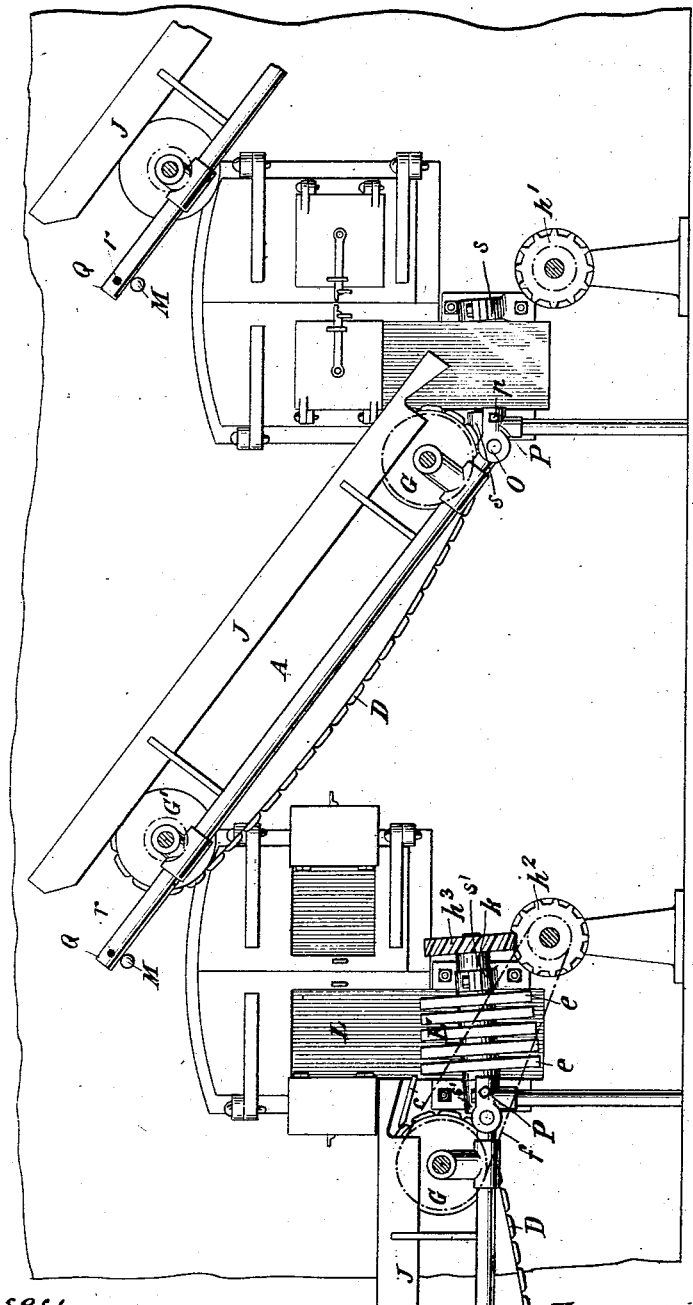

Referring now to the drawings hereto annexed, which illustrate the apparatus in the best and most practicable form of which we are aware and one especially designed for use in the manufacture of glass bottles or other similar articles, Figure 1 is a side elevation of the apparatus complete. Fig. 2 is a plan view showing, partly in section, the ovens to which the conveyer leads. Fig. 3 is a view, partly in elevation and partly in section, showing more in detail the means for removing sections of the conveyer out of operative relations with each other.

A designates a conveyer which, in the present instance, is in the form of an endless belt or series of slats D, of refractory material, supported by or running over rollers G, driven in any suitable manner, as by a belt F. This conveyer is of any desired length and extends from the molder's bench or blower's table to the ovens, and it is preferably made in separate sections, as shown, there being at the ovens a section extending between adjacent furnace-doors, for the purpose hereinafter explained. At the sides of the conveyer are boards J J, to prevent the articles conveyed from falling off. The discharging end $a$ of each section is at a slightly higher elevation than the adjacent or receiving end $b$ of the next conveyer, and between these two ends there is a short stationary incline $c$, down which the bottles or other articles roll from one section of the conveyer to the next. This not only insures the proper progression of the articles from section to section, but prevents the hot articles from a tendency to flatten and enables them to retain their shape.

Under the conveyer at intervals, as, for instance, under each section, is placed a heater B, consisting of gas-jets or any other suitable means for heating the conveyer as it progresses in order to retard the cooling of the heated articles on it. These heaters are particularly desirable and have been found practically necessary where the distance between the blower's bench and the ovens is sufficient to otherwise permit of a deleterious cooling of the glass articles.

We prefer to have the endless belt or chain A somewhat loose, but not so much so as to interfere with its certain operation, so as to permit the conveyer to sag slightly at the middle and induce the bottles to roll somewhat thereon.

By making our conveyer in sections, as has been shown, we can change the directions of the bottles at will without the use of switches, hoppers, or other deflecting devices, for it is evident that upon reaching the top of the incline $c$ they will roll off upon the succeeding conveyer whether it be in alinement with the one which they are leaving or not. Then, too, the system may comprise any number of branch conveyers feeding into a main conveyer.

By changing the gearing upon any section of the conveyer it can be speeded faster or slower than the abutting sections. We prefer to increase the speed progressively toward the furnace-door, so that if the blowers lay the bottles upon the first conveyer in bunches they are separated more and more as they reach successive sections whose speed is greater, and so, upon their reaching the oven L, ample time is given for the laying-up boy to handle each bottle without interference from the others. One method of accomplishing this is illustrated in the drawings, where the belt or chain $f$, by which power is transmitted from the first to the second section of the conveyer, is arranged upon the respective driving-wheels G, so that the speed of the second or right-hand section is doubled. Any method of increasing the speed may, however, be employed.

The conveyer passes the ovens on a different level from that of the oven-doors, so that the attendants at the ovens may at all times have free access to their interiors for stacking up the articles as they are brought to and delivered in the same.

The device which we have designed for transferring the articles into the ovens is an independent or auxiliary conveyer receiving power from any suitable source and entering the oven through a special opening. The delivery end of this conveyer is above the level of the floor or shelf upon which the articles are deposited, so that the articles as they leave the conveyer are carried away from the same into positions where they may be readily taken up and stacked by the attendant. In the special device illustrated for this purpose E designates the auxiliary or oven conveyer, which is composed of a series of sprocket-chains $e$ $e$ and sprocket-wheels mounted upon a suitable shaft driven by the power-shaft.

The receiving end of the auxiliary conveyer is somewhat below the level of the delivery end of the adjacent section of the main conveyer, an inclined plane $c$ being interposed between the two, down which the bottles or other articles roll. As shown in the several figures, the front wall of the oven below the level of the floor and immediately under the opening for the auxiliary conveyer is cut away, and the said conveyer passes up into the oven through such cut-away part, terminating at a point within the oven and above the floor of the same. Between the entering end of the conveyer and the oven-floor is an inclined plane H, down which the glass articles roll away from the conveyer to the oven-floor, where the attendant or laying-up boy may catch them with his fork and place them in tiers in the oven. Any means, such as a board $g$, is provided at the side of the conveyer E, exterior to the oven, to prevent the articles from rolling off.

With the construction described a bottle, upon reaching the oven-conveyer, is caught by one of the sections of the latter and carried lengthwise into the oven. In order, however, to better secure this result, we sometimes place the shaft bearing the sprocket-wheels of the oven-conveyer E at an oblique angle to the plane of the main conveyer, as is shown in Fig. 1, or in other ways produce a differential speed between the sections of the conveyer, so that a bottle in reaching the said conveyer is necessarily turned and carried end on into the oven in the proper position for lifting by the stacking-fork when it has left the conveyer, as shown in Fig. 2.

By making the sections of the main conveyer removable the last of the series may be taken away when the fartherest oven is filled and the oven-conveyer E attached to the end of the next section, and thus be utilized for filling all the ovens.

In Fig. 3 we have illustrated one way of cutting out a section of the conveyer. Supposing the oven-conveyer to have fed the right-hand oven, as shown in Figs. 1 and 2, until it is filled, then the oven-conveyer E, which in this instance is shown for convenience to have been operated by the worm-gear $h^2$ $h^3$, (see Fig. 3,) is disunited from G by the removal of the belt $f$. The shaft $k$ is withdrawn from its bearings $s$ $s'$. The section A may be swung upward upon the hinge-joint O upon withdrawing the bolt $p$ from the sleeve P, into which the side support Q fits, and fastened in the position shown in Fig. 3 by any suitable means, as by the pin M, set in any fixed support. Then the shaft $k$ of the oven-conveyer E is inserted in bearings $s'$ $s'$ at the left-hand oven, and the conveyer is geared to the driver G and is in operative condition again with reference to the preceding section of the main conveyer.

It is apparent that any other means of cutting out a section may be used, as, for example, by employing a sleeve and bolt at the forward end similar to P and p (shown in Fig. 3) at the rear end of the section, instead of the hinge-joint O, the section may be entirely removed, or instead of swinging one end vertically it may be hinged to be swung in a horizontal plane, when the bolt at the rear end is withdrawn.

It is preferred that the oven-conveyer be geared to run twice as fast as the adjoining section of the main conveyer, as shown, so that the bottles will not strike nor otherwise interfere with each other while being carried into the oven, but will be fed rapidly upon H, as appears more clearly in Fig. 2, and roll away, thus avoiding any accumulation on or near the conveyer.

We would state that according to our information on this subject not only has no mechanical conveyer for transferring glass articles to and into the annealing-ovens been used prior to the invention by us of such a device, but that heretofore such a device in any known form has been regarded by glass manufacturers generally as impracticable. An apparatus constructed and operating in substantially the manner described, however, we have found to possess the greatest practical advantages and value. It dispenses with the services of a very large number of operators and works uninterruptedly and efficiently without injury to the glass or interference of any kind with the other usual and necessary operations in the art.

We are well aware that conveyers for many things have been used or proposed, and we do not claim a conveyer whose distinguishing characteristic is merely that it is designed for glass rather than other substances or articles.

What we claim, however, as our invention, and desire to secure by Letters Patent, is the distinctly novel and useful improvement in the art of manufacturing articles of glassware residing in the following, to wit:

1. A device for transferring glass articles from the molder's table or blower's bench to the annealing-ovens of glass manufactories consisting in the combination with a main mechanical conveyer leading from the desired point to and in front of said ovens, but on a different level from the doors thereof, of an auxiliary conveyer adapted to receive the articles carried by the main conveyer and extending into the oven obliquely to the main conveyer, and having its delivery end above the level of the floor of the same, as set forth.

2. A device for transferring glass articles from the molder's table or blower's bench to and into the annealing-ovens in glass manufactories consisting in the combination with a main mechanical conveyer leading from the desired point to and in front of a series of said ovens, but on a different level from its doors thereof, said conveyer being composed of separate sections, each extending from the door of one oven to that of the next, of an auxiliary conveyer adapted to be mounted at the end of a section so as to receive the articles carried thereby and extending into the oven adjacent to the end of such section obliquely to the said section, and having its delivery end above the level of the floor of the oven, as set forth.

3. In a conveyer for transporting articles of glassware and delivering them to the annealing-oven or leer, the combination of a main conveyer extending to the door of the leer, with an auxiliary or oven conveyer extending therefrom into the leer to a point above the floor of the same, and an inclined plane leading from the delivery end thereof to the oven-floor, as set forth.

4. A device for conveying articles of glassware into an annealing-oven or leer comprising a mechanical conveyer, such as an endless belt, supported in front of said oven and entering the same so that its delivery end within said oven is above the level of the floor, in combination with an inclined plane extending from the delivery end of the conveyer to the floor of the oven, as set forth.

5. A device for transporting heated articles of glassware composed of a series of endless-belt conveyers, the receiving end of one section being on a lower level than the delivery end of the section adjacent thereto, in combination with inclined planes bridging the said ends whereby the articles conveyed will roll from one section of the conveyer to the next, as set forth.

6. The combination with a series of annealing-ovens or leers, each having a door of a sectional conveyer extending along in front of the same, each section being pivotally mounted on a support in front of a door, and means for supporting the free ends of the sections above and out of the way of the door adjacent thereto, as set forth.

7. The combination with a series of annealing-ovens or leers, each having a door, of a sectional conveyer extending along in front of the leer and composed of removable sections extending between adjacent doors, a removable transverse conveyer, and power-actuating devices arranged in front of each door, for actuating the transverse conveyer, as set forth.

In testimony whereof we have hereunto set our hands this 2d day of January, 1896.

EDWARD H. EVERETT.
  ALEXANDER SAMUELSON.

Witnesses:
  JAS. R. FITZGIBBON,
  HARMAN L. KNAUBER.